March 31, 1959 I. KAMLUKIN 2,880,034
GARDEN SULKY WITH DUMP BODY
Filed Feb. 14, 1955 6 Sheets-Sheet 1

March 31, 1959 — I. KAMLUKIN — 2,880,034
GARDEN SULKY WITH DUMP BODY
Filed Feb. 14, 1955 — 6 Sheets-Sheet 5

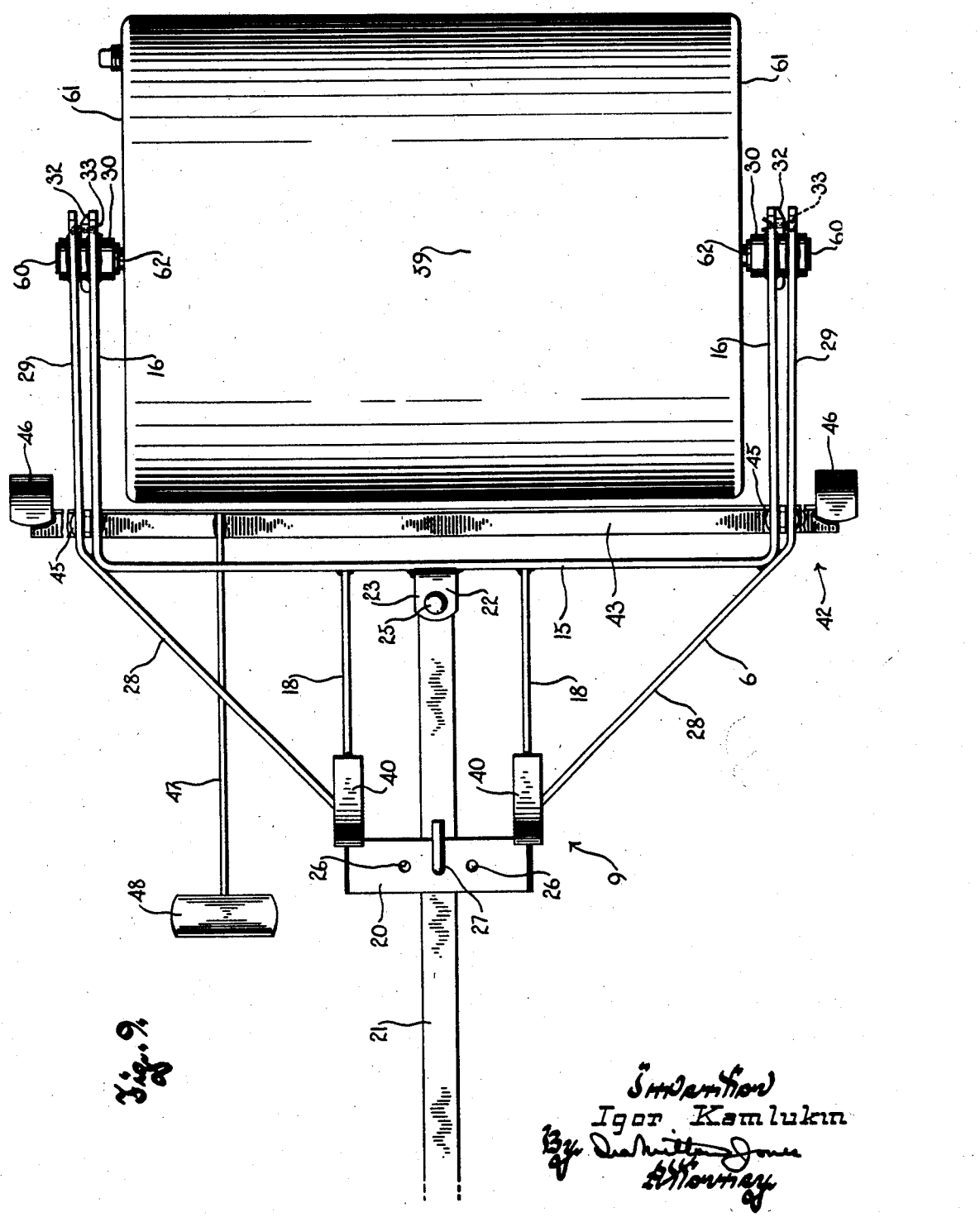

United States Patent Office 2,880,034
Patented Mar. 31, 1959

2,880,034

GARDEN SULKY WITH DUMP BODY

Igor Kamlukin, Milwaukee, Wis., assignor to Simplicity Manufacturing Company, Port Washington, Wis., a corporation of Wisconsin Application February 14, 1955, Serial No. 487,906

2 Claims. (Cl. 298—5)

This invention relates to gardening implements of the type which are connectible with a two wheel garden tractor or other similar draft means, and has more particular reference to the provision of a sulky adapted to be coupled with the tractor to enable an operator thereof to ride about during various gardening operations.

In general, it is a purpose of this invention to provide a simple and inexpensive attachment for two wheel garden tractors which not only provides a sulky by which the operator of the tractor may ride during such operations as ploughing, cultivating, lawn mowing and the like, but which sulky is readily convertible to either a dump cart or a lawn roller upon which the operator of the tractor may ride.

Still another purpose of this invention resides in the provision of a combination sulky and dump cart having a body which may be readily swung rearwardly to a dumping position about either of two tilt axes, one of which provides for inversion of the body to effect complete emptying of its contents.

Still another object of this invention resides in the provision of a combination sulky and two wheel dump cart wherein the body of the dump cart is substantially balanced upon its tilt axis to facilitate dumping of its contents, and wherein the sulky is provided with a seat which directly overlies the front portion of the dump body and normally prevents accidental rearward tilting of the body, the seat being pivotally supported on the sulky chassis for forward swinging motion away from the front of the body to enable the same to be swung to its dumping position.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiments of the invention constructed according to the best modes so far devised for the practical application of the principles thereof and in which:

Figure 5 is a perspective view of the carrier by which the dump body is mounted on the axle of the sulky;

Figure 6 is a fragmentary front elevational view illustrating a portion of the axle of the sulky and one of the wheels thereon;

Figure 7 is an enlarged detail view taken through Figure 6 along the plane of the line 7—7 and illustrating the manner in which the chassis frame is connected to the axle;

Figure 9 is a plan view of the lawn roller shown in Figure 8, but with the sulky seat removed.

Figure 1:
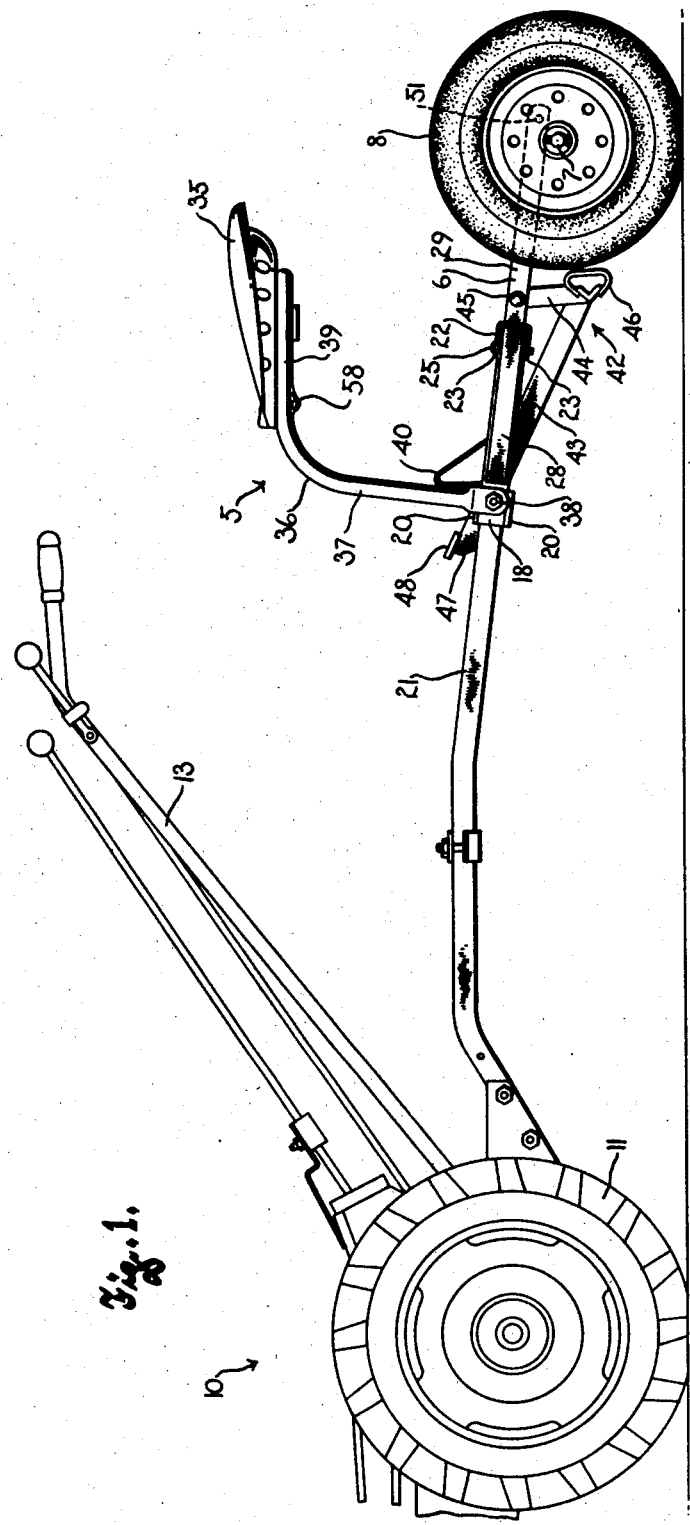
Figure 1 is a side elevational view illustrating a two wheel tractor having the sulky of this invention coupled to the rear thereof.

Referring now more particularly to the accompanying drawings, in which like numerals designate like parts throughout the several views, the numeral 5 generally designated the sulky of this invention. It comprises a chassis 6 supported on an axle 7 having wheels 8 rotatably mounted on its opposite ends, and having a hitch device 9 rigidly mounted on the front of the chassis to enable it to be coupled to the rear of a two wheel garden tractor 10.

The tractor 10 is of conventional construction, having a pair of traction wheels 11 driven by a small internal combustion engine 12, the tractor having rearwardly extending handles 13 accessible to an operator of the tractor walking behind it and by which the tractor is guided for such gardening operations as cultivating, ploughing, mowing and the like. These different operations, of course, are usually performed by different implements which may be readily coupled either to the front or the rear of the tractor.

Figure 4:
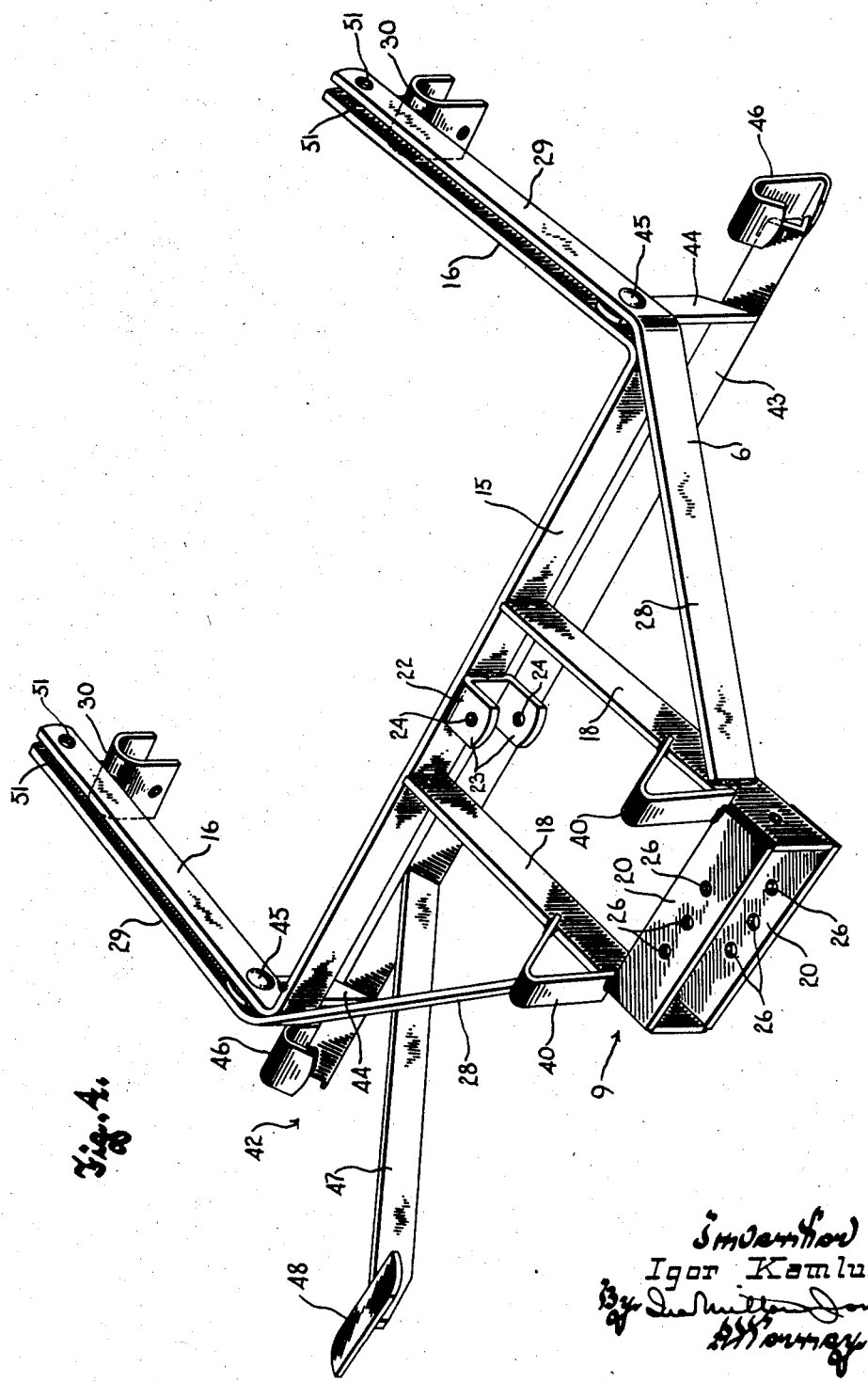
Figure 4 is a perspective view of the frame of which the sulky chassis is comprised.

The chassis 6 of the sulky, as seen best in Figure 4, comprises a substantially U-shaped frame having a straight transverse bight 15 and opposite arms 16 of equal length joined to the ends of the bight and extending rearwardly therefrom in substantially parallel relationship to one another. The frame is preferably made from a length of bar stock having the arms 16 bent flatwise therefrom.

The hitch device 9 comprises a similar but much smaller U-shaped frame, likewise made of bar stock, and having the extremities of its arms 18 joined to the central portion of the bight 15 of the larger frame and projecting forwardly therefrom in substantially parallel relationship. The bight of the smaller frame is comprised of spaced upper and lower crossbars 20 spanning the space between the forward ends of the arms 18 and rigidly secured thereto as by welding. The spaced upper and lower bars 20 are adapted to receive therebetween the rear end portion of an elongated tongue 21, to enable the sulky chassis to be connected to the rear of the tractor.

Also for this purpose, a clevis 22 is secured to the bight 15 of the larger frame, on the front thereof midway between the arms 18 of the hitch device, with the legs 23 of the clevis in the same spaced superimposed relationship as the crossbars 20 to receive the rear extremity of the tongue 21. The legs of the clevis have vertically aligning apertures 24 therein to receive a hitch pin 25, and the pin, in turn, is adapted to pass through an aperture (not shown) in the rear of the tongue 21 to couple the tongue to the sulky and at the same time provide for swinging of the tongue laterally about a substantially vertical pivot axis. The tongue is guided for such lateral swinging motion by the crossbars 20, which loosely embrace a portion of the tongue spaced a distance forwardly of its pivot connection with the sulky frame.

It is a feature of this invention that the tongue 21 may be secured to the crossbars of the hitch device either with the tongue held in a normal position on the longitudinal axis of the sulky and perpendicular to the axis of the sulky axle (as seen in Figure 9), or with the tongue in any one of a plurality of positions of angular adjustment with its front end swung laterally to one side or the other off the longitudinal centerline of the sulky. For this purpose, the crossbars are provided with a series of vertically aligned apertures 26, three pairs being illustrated, and each pair of said apertures being adapted to align with a hole (not shown) in the tongue to receive a second hinge pin 27. Depending upon the crossbar holes through which it is inserted, the pin 27 may hold the tongue in any one of three positions of adjustment, and provides for connection of the sulky with the tractor with the sulky offset laterally with respect to the tractor to enable the latter to be maneuvered close to fences or other obstacles without interference from the sulky, or to enable mowing operations to be performed by the tractor without danger of the sulky wheels riding over uncut grass. In addition, the lateral adjustability of the tongue makes it possible to provide the sulky with a wheel tread substantially greater than that of the tractor, without interfering with mowing operations or the like, or with maneuverability of the tractor.

By reason of this manner of connecting the tongue to the sulky, it will also be noted that the rear end portion of the tongue is more or less rigidly connected to the sulky chassis, and it will be appreciated that since the front end portion of the tongue is supported by its connection (not shown) with the rear of the tractor, the tongue serves to hold the frame of the sulky chassis in a nearly horizontal position with the bight 15 thereof at a slightly higher elevation than the rear end portions of its arms 16. It will also be understood that the rear end portions of the arms 16 are supported upon and secured to the axle 7 in a manner to be described shortly.

The hitch device is reinforced by braces comprising bars 28 extending angularly between the forward end portions of the arms 18 and the ends of the bight 15 of the larger frame and secured thereto as by welding. These brace bars have rearward extensions 29 integral therewith, overlying the outer sides of the arms 16 of the larger U-shaped frame in closely spaced substantially parallel relationship thereto, so as to provide, in effect, a pair of arms extending rearwardly from each end of the bight 15 of the larger frame. The rear end portion of each pair of arms thus provided, is readily detachably securable to the axle 7 of the sulky, and for this purpose, each pair of arms has an inverted U-shaped clip 30 welded to its underside, near the rear extremities of the arms. These clips, by their connections with the arms, serve to hold the rear end portions of the arms of each pair thereof at substantially the same spacing as the forward end portions of the arms and, since the legs of the U-shaped clips project downwardly and are spaced apart from one another in the direction of the length of the arms, it will be apparent that the clips provide clevises which may slide over the axle from above, with the legs of the clevises embracing the axle.

The clevises 30 are preferably secured to the axle in a manner precluding relative rotation therebetween. For this purpose, similar inverted U-shaped clips 31 embracing the axle are welded thereto in positions inwardly of the wheels, and these clips are of a size to nest within the clevises 30 on the chassis frame. Thus, when the clevises 30 on the frame are engaged over the U-shaped clips 31 on the axle, the frame may be secured to the axle as by a right angle pin 32 having one leg inserted through suitable holes in the downwardly extending legs of the clips 31 and clevises 30 and passing beneath the axle; it being understood that a cotter key 33, or the like, may be employed to secure the pin against accidental displacement.

It should be noted that the transverse spacing between the rearwardly extending arms of the U-shaped chassis frame is slightly less than the length of the axle 7 so that the pairs of arms are received between the wheels 8 of the chassis. The U-shaped clips 31, accordingly, are secured to the axle at positions located a short distance inwardly of its ends, at the same transverse spacing as the clevises 30 on the rear end portions of the frame arms.

The sulky is also provided with a seat 35 located at the front portion of the chassis frame and a substantial distance above the bight 15 thereof. It is supported from the frame by a bracket 36 having substantially upright legs 37, the lower end portions of which embrace the front ends of the arms 18 of the hitch device and are pivotally connected thereto, as by bolts 38, so that the bracket may swing on a horizontal axis parallel to the bight 15 of the frame, but located a substantial distance forwardly thereof. At their upper ends, the legs 37 of the bracket are bent rearwardly, as at 39, and extend substantially horizontally under the seat 35 to which they are secured by any suitable means.

Because of the hinge connection between the seat bracket and the front of the hitch device, stops 40 are provided to limit rearward swinging motion of the seat bracket at a point at which the upright legs 37 thereof are inclined slightly toward the rear of the chassis frame. These stops comprise inverted U-shaped bars, each fixed to one of the arms 18 of the hitch device and projecting upwardly therefrom so as to lie directly behind one of the legs 37 of the seat bracket. The stops thus provided are engaged by portions of the bracket legs spaced a short distance above the hinge axis of the bracket, to define the operative position of the bracket and the seat carried thereby.

Figure 3:
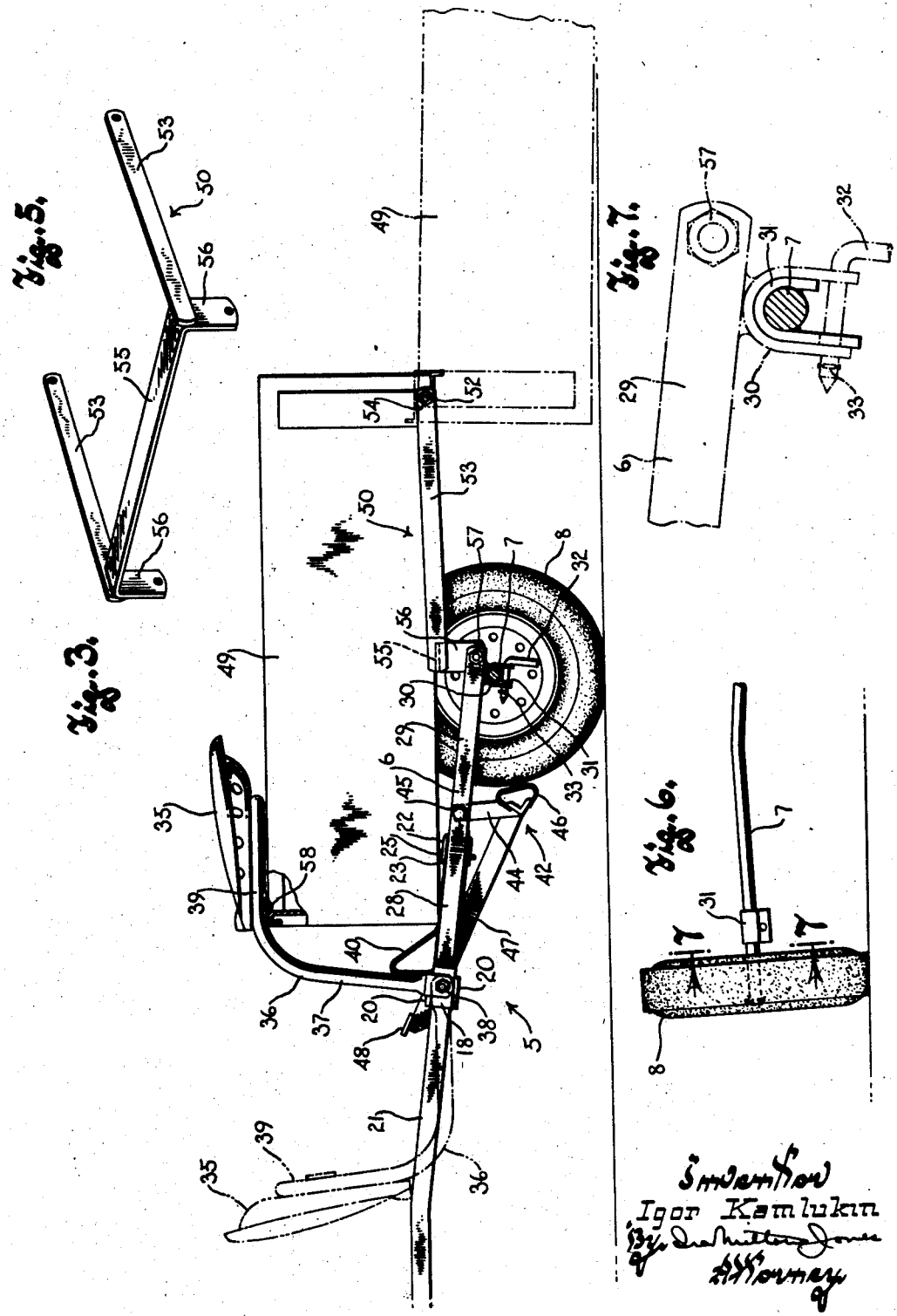
Figure 3 is a side elevational view of the dump cart shown in Figure 2, with the near-side wheel removed for purposes of illustration.

If the seat is not to be used, it may be swung forwardly on its hinge connection to the position shown in construction lines in Figure 3, and defined by the engagement of the seat per se with the tongue 21 by which the sulky is coupled to the tractor.

From the description thus far, it will be appreciated that the sulky of this invention is highly useful in that it allows an operator of the tractor to ride along behind it during the performance of such gardening operations as cultivating, ploughing, mowing, etc., it being understood that the seat 35 is mounted so as to make the controls on the tractor handles 13 accessible in a most convenient manner to an operator occupying the seat.

An additional feature of the sulky resides in the fact that it is provided with a foot operated brake, indicated generally by the numeral 42, which may be readily actuated by an operator occupying the seat 35 to slow or stop the sulky whenever it becomes necessary. The brake comprises a brake bar 43 which, in the present case, is shown comprised of an angle iron extending transversely across the chassis frame a short distance beneath the bight 15 thereof and projecting beyond the sides of the frame. The brake bar is suspended from the chassis frame by a pair of links 44 having their lower ends welded to the brake bar and extending upwardly therefrom from between the pairs of arms at each side of the U-shaped chassis frame and pivotally connected to the arms a short distance rearwardly of the bight 15 of the frame, as by rivets 45. In this manner the bar is suspended for bodily swinging motion about a horizontal axis in directions forwardly and rearwardly toward and from the wheels 8, to enable brake shoes 46 fixed to the end portions of the brake bar to be either engaged with or disengaged from the wheels 8. Normally, the brake shoes are spaced a slight distance forwardly of the wheels by the suspension of the bar from the chassis frame, and rearward swinging motion may be readily imparted to the bar to engage the brake by means of a lever 47 having one end fixed to the brake bar a slight distance inwardly from one end of the bar, the lever extending forwardly a short distance beyond the front of the hitch device and having a pedal 48 on its forward extremity to be engaged by the foot of an operator occupying the seat whenever the brake is to be applied.

Figure 2:
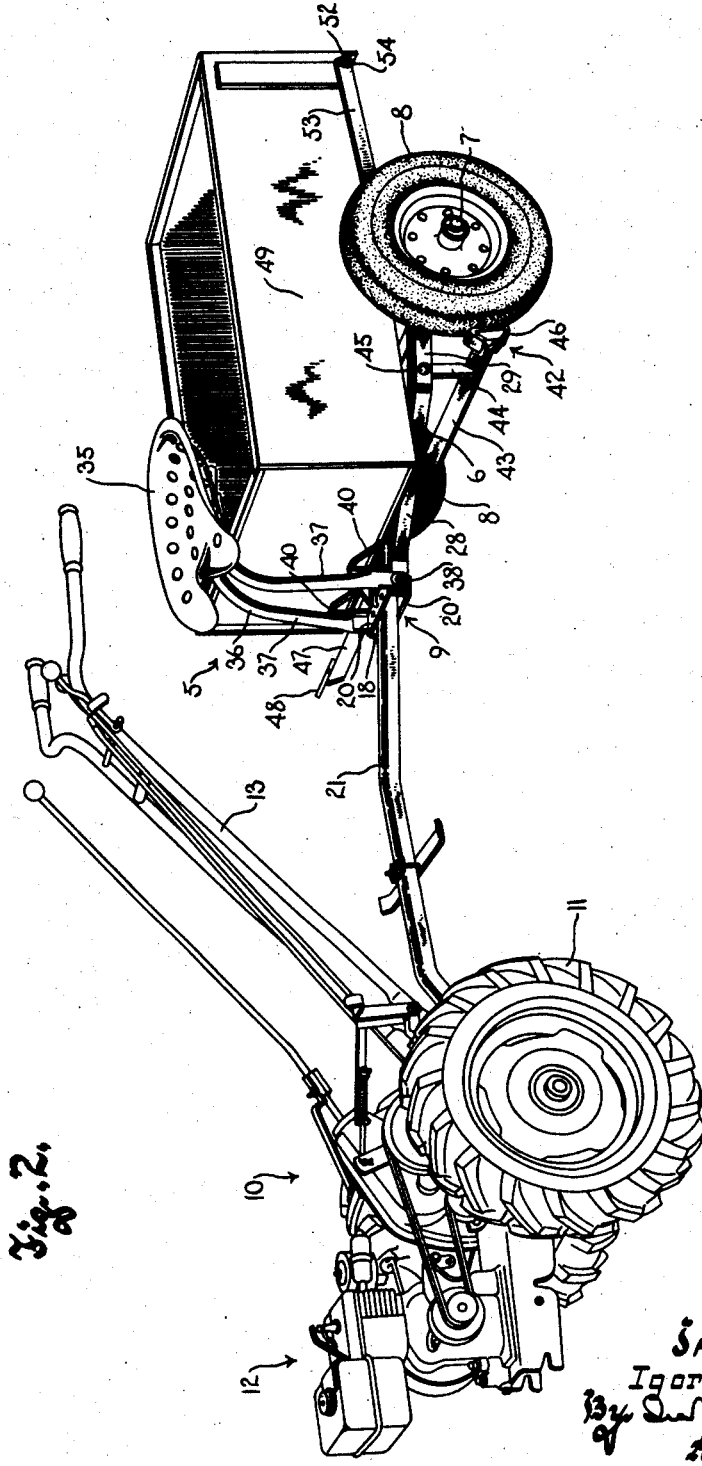
Figure 2 is a perspective view similar to Figure 1 but illustrating the sulky converted to a dump cart.
Figure 8:
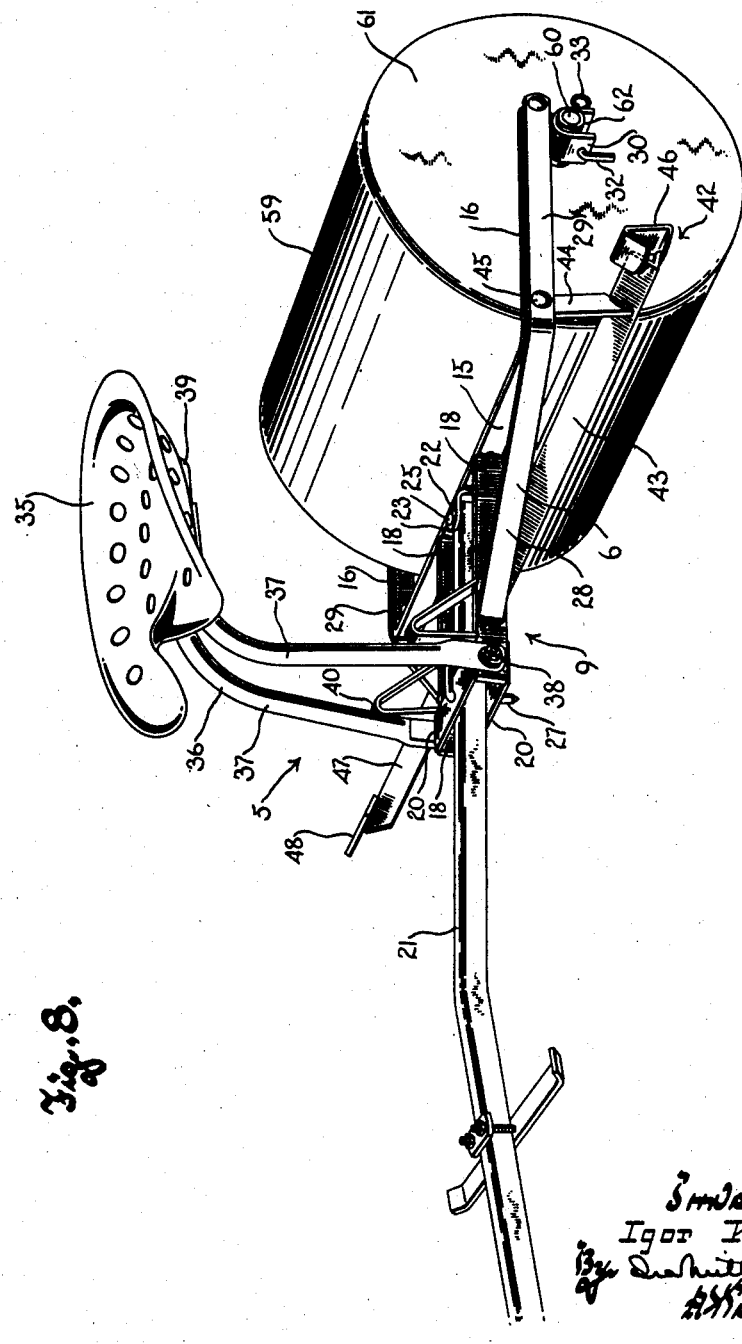
Figure 8 is a perspective view illustrating the sulky of this invention converted to a lawn roller.

It is one of the main features of this invention that the sulky thus described is capable of being easily converted to either a dump cart, as shown in Figures 2 and 3, or a lawn roller, as shown in Figures 8 and 9, while in either case permitting the operator to ride about on the converted device.

The conversion of the sulky shown in Figure 1 to a dump cart like that shown in Figures 2 and 3, does not entail removal of any of the components of the sulky, but merely the mounting of the box-like dump body 49 on the rear portion of the chassis by means of a carrier 50 on the body which disposes the body substantially with the medial portion thereof over the axle 7 and the bottom of the body spaced a slight distance above the axle.

For this purpose, the rear end portions of each pair of arms on the U-shaped chassis frame are apertured as at 51 to provide transversely spaced pivotal supports on the axle aligning with one another on a common horizontal axis. The dump body is also provided with transversely spaced pivotal supports 52 aligning on a common horizontal axis parallel to but spaced rearwardly from the axle pivots. The body pivots may be in the nature of studs fixed on and projecting from the opposite sides of the body at its rear and adjacent to the bottom of the body.

The carrier 50 by which the body is mounted on the sulky chassis comprises a pair of opposite levers 53 extending between the axle 7 and the rear of the body, and having their rear ends connected to the pivotal supports 52 on the body. It will be understood, of course, that the levers embrace the opposite sides of the body, which has a transverse dimension slightly less than the spacing between the wheels 8 of the chassis, so that the body fits between them. Nuts 54 threaded on the studs 52 preclude displacement of the rear end portions of the levers 53 from the pivots provided by the studs.

The levers extend forwardly from the rear of the body nearly parallel to the flat bottom thereof, and their forward ends are disposed substantially midway between the opposite longitudinal ends of the body. In addition, the forward ends of the levers 53 are joined to the ends of a crossbar 55 extending transversely between the levers and welded thereto, with the crossbar lying in a substantially horizontal plane to have flatwise supporting engagement with the bottom of the body. Downward extensions 56 on the forward end portions of each of the levers, preferably formed integral with the crossbars 55, have their lower ends received between the apertured rear end portions of each pair of arms on the U-shaped chassis frame and are pivotally connected to the arms, as by bolts 57 passing through the apertures 51 in the frame arms and the extensions 56 therebetween to provide for up and down swinging of the levers 53 about a horizontal axis substantially parallel to the axle 7 and located a slight distance above and to the rear of the axle.

It is a highly important feature of this invention that the levers 53 have a length so related to the longitudinal dimension of the dump body 49 that the body is substantially balanced upon the pivotal supports 57 provided by the bolt connections between the rear ends of the chassis arms and the downward extensions 56 on the levers 53. Hence, the forward end portion of the body ahead of the body support provided by the crossbar 55, is substantially equal in length to the portion of the body rearwardly of the crossbar and, as shown in Figure 3, the front end of the body may rest on the forwardly extending arms 18 of the hitch device and the angular braces 28 by which these arms are reinforced.

Because of this manner of mounting the body, it may carry loads of close to 1000 lbs. and still be easily manually tilted rearwardly about the axle carried pivotal supports 57 to a dumping position defined by the engagement of the rear end of the body with the ground. This entails rearward tilting motion of the body through a relatively short arc and, of course, requires the operator of the implement to manually assist in the unloading of the body contents with a shovel, or other gardening tool, until a substantial part of the contents has been unloaded. Thereafter, the operator may easily swing the body to an inverted position about its pivotal connections with the rear ends of the levers 53, as indicated in construction lines in Figure 3, to effect complete discharge of the body contents.

With the body in its normal horizontal transit position, as shown in Figure 3, it will be seen that the front end portion of the body projects under the seat 35 and the rearwardly extending horizontal legs 39 of the seat bracket so that the seat and its bracket are utilized to prevent accidental rearward tilting of the dump body when normal substantially uniformly distributed loads are being carried thereby. However, when an operator of the dump cart occupies the seat 35, there is little danger that the dump body even with a load concentrated in the rear portion of the body, will tilt rearwardly toward an unloading position; and to assure against sudden tilting of the body when the operator vacates the seat, a latching projection 58 on the underside of one or both of the rearwardly extending end portions of the legs 37 of the seat bracket 36 may be provided to engage behind the upper edge of the front wall of the dump body in the manner seen in Figure 3.

As shown in Figures 8 and 9, either the sulky or the dump cart may be readily converted to a lawn roller of the type comprising a substantially large diameter hollow cylinder 59 of sheet metal having coaxial trunnions or journals 60 projecting from its opposite ends. These journals may be short stub shafts welded to the end walls 61 of the drum, or they may comprise the extremities of a shaft extending continuously through the drum.

Conversion of the sulky to a lawn roller merely involves detachment of the clevises 30 on the frame arms from the axle 7 of the sulky and reengagement of these clevises over the trunnions 60 on the ends of the roller 59, it being understood that the axial length of the roller is slightly less than the spacing of the frame arms. In this case also, the clevises fit over bushings 62 welded on the trunnions, the bushings being of a diameter to be rotatably received in the clevises 30. The legs of the frame clevises, of course, are not non-rotatably secured to the axle provided by the roller as was the case with the sulky and dump cart. Accidental disengagement of the sulky chassis from the roller, of course, is prevented by means of the pins 32 and the cotter keys 33 previously described, the pins passing through the legs of the clevises beneath the trunnions.

When thus converted to a lawn roller, the operator of the tractor may still occupy the seat 35, and it is a feature of the roller that the brake bar 43 may then act directly upon the cylindrical surface of the roller to either stop the roller or, when less firmly engaged with the surface thereof, to scrape mud or other debris therefrom. For this purpose, the flanges of the angle iron which provide the brake bar preferably face toward the surface of the roller to have their outer edges engaged therewith, without interference from the brake shoes 46.

From the foregoing description taken together with the accompanying drawings, it will be readily apparent to those skilled in the art, that this invention provides a highly useful riding sulky of a type adapted to be connected to the rear of a two wheel garden tractor or other draft means and which is unusually versatile in that it may be readily converted to either a dump cart or a lawn roller, in all cases allowing the operator to ride along with the tractor.

What I claim as my invention is:

1. In a sulky of the character described: means providing an axle; a substantially U-shaped frame having a transverse bight spaced forwardly of said axle, and opposite arms extending rearwardly from said bight toward the axle; means detachably connecting the rear end portions of said arms to the axle; means on the front of the frame providing a hitch for connecting the sulky with draft means; a seat; means on the frame pivotally mounting the seat for swinging movement to and from an operative position above the bight of the frame; means on the frame adjacent to the axle providing transversely spaced pivotal supports disposed on a common horizontal axis; a dump body on the sulky occupying a normally horizontal position thereon; and means readily detachably mounting the body on said pivotal supports for rearward tilting motion of the body out of said normal horizontal position.

2. In a riding sulky having wheel supported axle means, a chassis comprising: a rigid frame having a substantially U-shaped rear portion with a transverse bight at its front end and opposite transversely spaced arms extending rearwardly from the bight, and a front end portion projecting forwardly from the bight; axle engaging means on the ends of the arms substantially equispaced from the bight connecting the frame to the axle means of the sulky; means on the frame for connecting the sulk with draft means; means on the arms of the rear frame portion adjacent to the axle engaging means thereof providing transversely spaced pivotal supports disposed on a common transverse axis; a dump body; means readily detachably and tiltably mounting the dump body on said pivotal supports with the body projecting substantially equally forwardly and rearwardly of said supports and with its front end portion over the bight in the normal carrying position of the body from which position the body may be tilted rearwardly; a seat; and means mounting the seat on the front frame portion for swinging movement about a transverse axis substantially at the level of the rearwardly extending arms, between an operative position at which the seat is disposed over the front end portion of the dump body and an inoperative position at which the seat is swung forwardly clear of the front of the dump body so that when the seat is in its operative position it blocks rearward tilting of the dump body.

References Cited in the file of this patent

UNITED STATES PATENTS

| | | |
|---|---|---|
| 394,846 | Falk | Dec. 18, 1888 |
| 510,426 | Higbee | Dec. 12, 1893 |
| 954,229 | Turner | Apr. 5, 1910 |
| 1,170,248 | Gustafson | Feb. 1, 1916 |
| 1,261,263 | Meyers | Apr. 2, 1918 |
| 1,370,235 | Stewart | Mar. 1, 1921 |
| 1,933,955 | Arnold | Nov. 7, 1933 |
| 1,981,098 | Fahrney | Nov. 20, 1934 |
| 2,418,971 | Duffy | Apr. 15, 1947 |
| 2,491,417 | Pflantz et al. | Dec. 13, 1949 |
| 2,622,890 | Moses | Dec. 23, 1952 |
| 2,630,334 | Ewers | Mar. 3, 1953 |
| 2,676,032 | Stegeman | Apr. 20, 1954 |
| 2,701,616 | Cooper | Feb. 8, 1955 |

FOREIGN PATENTS

| | | |
|---|---|---|
| 1,013,408 | France | July 29, 1952 |
| 20,320 of 1897 | Great Britain | July 9, 1898 |